Figure 1:
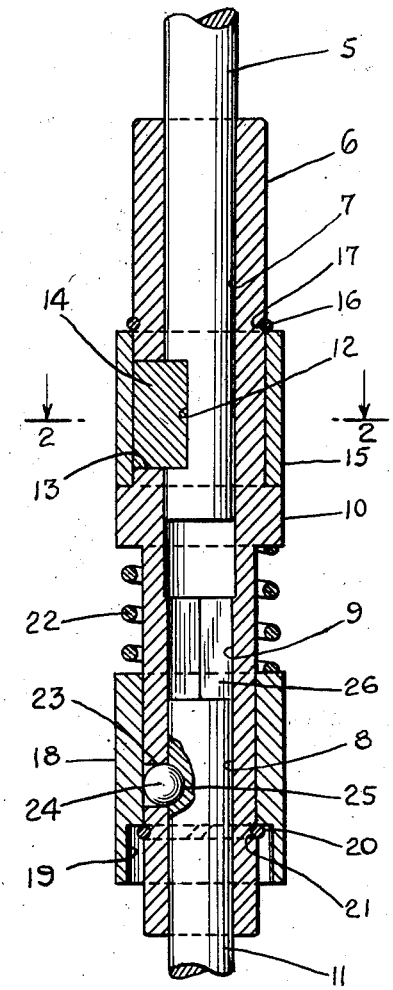

Oct. 23, 1956  R. G. EMRICK  2,767,992
CHUCK DEVICES FOR TAPS
Filed Aug. 23, 1954

INVENTOR.
ROBERT G. EMRICK
BY
*Howard E. Thompson*
ATTORNEY

United States Patent Office 2,767,992
Patented Oct. 23, 1956

2,767,992

CHUCK DEVICES FOR TAPS

Robert G. Emrick, Manhasset, N. Y.; Agnes G. Emrick, administratrix of said Robert G. Emrick, deceased Application August 23, 1954, Serial No. 451,364

4 Claims. (Cl. 279—82)

This invention relates to chuck devices for mounting of taps and similar tools. More particularly, the invention deals with means for establishing a strong and durable key coupling of the chuck with the drive spindle or shaft to obviate wear, to which devices of this type and kind are usually subjected in utilizing conventional types of key constructions.

Still more particularly, the invention deals with a chuck structure having means for freely coupling and uncoupling a tap or other tool with the chuck.

Figure 2:
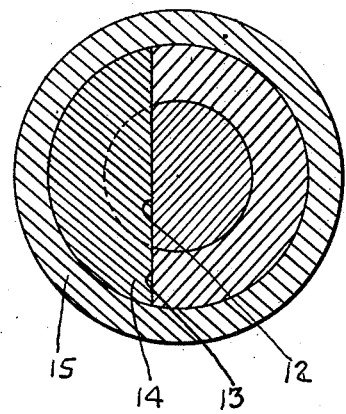

The novel features of the invention will be best understood from the following description, when taken together with the accompanying drawing, in which certain embodiments of the invention are disclosed and, in which the separate parts are designated by suitable reference characters in each of the views and, in which:

Fig. 1 is a longitudinal sectional view through a chuck made according to my invention, with parts of the construction shown in elevation and with parts broken away; and Fig. 2 is an enlarged cross-section on the line 2—2 of Fig. 1.

In Fig. 1 of the drawing, 5 represents the drive spindle with which one of my improved chucks 6 is adapted to be coupled and keyed. The chuck 6 comprises a long tubular body having end bores 7 and 8, joined by a square intermediate bore 9. At 10 is shown a substantially central collar portion which divides the chuck into the spindle end 5 and the tool receiving end, the tap or tool being indicated, in part, at 11.

The spindle 5 has a transverse crescent-shaped key recess 12 which extends an appreciable length on the spindle, as clearly noted in Fig. 1 of the drawing. This key recess registers with a corresponding recess 13 formed in the upper spindle end portion of the chuck. These recesses are adapted to receive a crescent-shaped key 14, shown in section in Fig. 2 of the drawing. Mounted on the upper end of the chuck is a sleeve 15, which abuts the collar 10 and envelopes the key 14 to retain the key in operative position. A split spring ring 16 is mounted in a groove 17 of the chuck and engages the upper end of the sleeve 15 to retain the sleeve against accidental displacement. Upon removal of the spring ring 16, the sleeve 15 can be raised to detach the key 14 in coupling and uncoupling the chuck with a spindle 5.

Mounted upon the lower end of the chuck is another sliding sleeve 18 having a recessed lower end, as at 19, the recessed end operating upon another split spring ring 20 arranged in a groove 21 on the chuck to retain the sleeve 18 against displacement and also to check downward movement thereof by a coil spring 22.

Mounted in an aperture 23 in the lower portion of the chuck is a key ball 24 adapted to operate in a recess 25 in the shank of the tool 11 to retain the tool against displacement from the chuck. The tool has, at its inner end, a square key portion 26, which fits the square bore 9 in positively keying the tool to the chuck body. It will appear that, upon raising the sleeve 18 against the action of the spring 22, the recess 19 of the sleeve will be brought into alinement with the ball 24, allowing the ball to move outwardly in withdrawal of the tool 11, thus providing a quick and simple coupling and uncoupling of the tool with the chuck body.

By providing the large crescent-like segment key 14 engaging the recesses 12 and 13, a strong and durable key coupling is provided between the spindle 5 and the chuck body 6. This key construction will obviate the wear and resultant play that is experienced with conventional elongated keys and key grooves, as commonly employed in devices of this type and kind. More particularly, a quick and simple method is provided for coupling a chuck with a spindle. It will, further, be apparent that the entire structure is kept within substantially one outside dimension controlled by the outside dimensions of the sleeves 15 and 18. This is desirable, particularly when devices of this type and kind are used in close quarters or, in other words, where several chuck devices are arranged to close proximity to each other, as in multiple tapping head structures.

Having fully described my invention, what I claim as new and desire to secure by Letters Patent is:

1. In chuck devices of the character described, an elongated relatively small diameter tubular chuck body, means at one end of the chuck body for detachably coupling a tool therewith, a drive spindle arranged in the other end of the chuck body, the spindle and body having axially and circumferentially long key receiving recesses, a key element arranged in said recesses in keying the chuck body against rotation and axial movement on the spindle, said key element having a curved outer surface conforming to and in alinement with the outer surface of said end of the chuck body, a sleeve mounted on the chuck body and housing said element in retaining the same in operative position, said sleeve seating on an enlarged portion of the chuck body, and a detachable ring mounted in the chuck body and engaging the other end of the sleeve in maintaining the sleeve in operative position on said chuck body.

2. A tool chuck of the class described, comprising an elongated tubular body, having a spindle receiving end and a tool receiving end, the spindle receiving end having an axially long key element operatively engaging the spindle, a sleeve on the spindle end only of the body normally supporting the key element in operative position, the tool end of said body having a sliding sleeve mounted thereon, said sliding sleeve having a recess opening through the lower end thereof, a split ring engaging the recessed portion of the sliding sleeve in supporting said sliding sleeve in operative position on said body, a coil spring normally urging the sliding sleeve in engagement with said split ring, a ball key mounted in the tool end of said body and normally held in operative position with respect to a tool arranged in said end of the body by said sliding sleeve, and said ball key being movable into the recess of said sliding sleeve in inward movement of the sliding sleeve to free a tool for detachment with respect to said body.

3. A tool chuck of the class described, comprising an elongated tubular body, having a spindle receiving end and a tool receiving end, the spindle receiving end having an axially long key element operatively engaging the spindle, a sleeve on the spindle end only of the body normally supporting the key element in operative position, the tool end of said body having a sliding sleeve mounted thereon, said sliding sleeve having a recess opening through the lower end thereof, a split ring engaging the recessed portion of the sliding sleeve in supporting said sliding sleeve in operative position on said body, a coil spring normally urging the sliding sleeve in engagement with said split ring, a ball key mounted in the tool end of said body and normally held in operative position with respect to a tool arranged in said end of the body by said sliding sleeve, said ball key being movable into the recess of said sliding sleeve in inward movement of the sliding sleeve to free a tool for detachment with respect to said body, the intermediate portion of said body having an angular bore for keying a tool against rotation in said body, and said intermediate portion of the body having an enlarged collar, against which the first named sleeve abuts and forming a seat for said spring.

4. In chuck devices of the character described, an elongated relatively small diameter tubular chuck body, means at one end of the chuck body for detachably coupling a tool therewith, a drive spindle arranged in the other end of the chuck body, the spindle and body having axially and circumferentially long key receiving recesses, a key element arranged in said recesses in keying the chuck body against rotation, and axial movement on the spindle, said key element having a curved outer surface conforming to and in alinement with the outer surface of said end of the chuck body, a sleeve mounted on the chuck body and housing said element in retaining the same in operative position, said sleeve seating on an enlarged portion of the chuck body, a detachable ring mounted in the chuck body and engaging the other end of the sleeve in maintaining the sleeve in operative position on said chuck body, said first named means comprising a sliding sleeve normally holding a ball key in operative engagement with a tool, a coil spring seating on said enlarged portion of the body and said sliding sleeve to hold said sliding sleeve in normal operative position, the lower end of said sliding sleeve having a recess opening outwardly through said end, means on said body and arranged in said recess to hold said sliding sleeve in operative position, and said ball key being movable into said recess in movement of the sliding sleeve into inoperative position against the action of said spring.

References Cited in the file of this patent

UNITED STATES PATENTS

| | | |
|---|---|---|
| 1,433,590 | Ziegler | Oct. 31, 1922 |
| 1,642,490 | Decker | Sept. 13, 1927 |
| 1,653,762 | Fegley et al. | Dec. 27, 1927 |
| 1,862,337 | Emrick | June 7, 1932 |
| 2,472,392 | Alexander | June 7, 1949 |
| 2,550,635 | Brown et al. | Apr. 24, 1951 |
| 2,680,636 | Griffin | June 8, 1954 |
| 2,689,741 | Emrick | Sept. 21, 1954 |